US011123701B2

(12) United States Patent
Aymonier (10) Patent No.: US 11,123,701 B2
(45) Date of Patent: Sep. 21, 2021

(54) DEVICE AND PROCESS UNDER CONDITIONS CLOSE TO THE SUPERCRITICAL RANGE OR UNDER SUPERCRITICAL CONDITIONS (71) Applicants: Centre national de la recherche scientifique, Paris (FR); ECOLE NAT SUPERIEURE ARTS ET METIERS ENSAM, En Champagne (FR); UNIVERSITÉ DE BORDEAUX, Bordeaux (FR); INSTITUT POLYTECHNIQUE DE BORDEAUX, Talence (FR)

(72) Inventor: Cyril Aymonier, Pessac (FR)

(73) Assignees: CENTRE NATIONAL DE LA RECHERCHE SCIENTIFIQUE, Paris (FR); ECOLE NAT SUPERIEURE ARTS ET METIERS ENSAM, Chalons en Champagne (FR); UNIVERSITÉ DE BORDEAUX, Bordeaux (FR); INSTITUT POLYTECHNIQUE DE BORDEAUX, Talence (FR)

( * ) Notice: Subject to any disclaimer, the term of this patent is extended or adjusted under 35 U.S.C. 154(b) by 0 days.

(21) Appl. No.: 16/764,670

(22) PCT Filed: Nov. 16, 2018

(86) PCT No.: PCT/EP2018/081652
§ 371 (c)(1),
(2) Date: Oct. 6, 2020

(87) PCT Pub. No.: WO2019/097032
PCT Pub. Date: May 23, 2019

(65) Prior Publication Data
US 2021/0077966 A1 Mar. 18, 2021

(30) Foreign Application Priority Data
Nov. 17, 2017 (FR) ...................... 17 60895

(51) Int. Cl.
B01J 3/00 (2006.01)
B01J 4/00 (2006.01)
(52) U.S. Cl.
CPC ............... B01J 3/008 (2013.01); B01J 4/008 (2013.01); B01J 2203/00 (2013.01); B01J 2219/00051 (2013.01); B01J 2219/00182 (2013.01); B01J 2219/2419 (2013.01)

(58) Field of Classification Search
CPC ........ B01J 3/008; B01J 4/008; B01J 2203/00; B01J 2219/2419; B01J 2219/0051; B01J 2219/00182; C02F 11/086; C02F 1/025
See application file for complete search history.

(56) References Cited

U.S. PATENT DOCUMENTS 5,543,057 A * 8/1996 Whiting ............... C02F 1/025
210/721
5,591,415 A 1/1997 Dassel et al.
6,056,883 A * 5/2000 Bond ..................... C02F 1/72
210/721

FOREIGN PATENT DOCUMENTS

FR 2858943 A1 2/2005
WO 2016179258 A1 11/2016

OTHER PUBLICATIONS

Borovaya, F. and Ravich, M., 1968. Solubulity of Sodium Carbonate and Orthophosphate in Aqueous Solutions of Sodium Hydroxide at Elevated Temperatures. Russian Journal of Inorganic Chemistry, 13(12), pp. 1720-1723.
INPI Search Report issued in French Application No. 1760895 and dated Jul. 16, 2018.
National Research Council. Using supercritical water oxidation to treat hydrolysate from VX neutralization. National Academies Press, 1998.
International Search Report issued in International Application No. PCT/EP2018/081652 and dated Jan. 25, 2019 (with English Translation).

* cited by examiner

Primary Examiner — Lessanework Seifu
(74) Attorney, Agent, or Firm — Troutman Pepper Hamilton Sanders LLP (57) ABSTRACT A process including introducing, into a device, an aqueous fluid containing at least one inorganic salt, the water of the aqueous fluid being in supercritical conditions or close to the supercritical range in the device, and measuring the concentration or the amount of inorganic salt in the device, this measurement preferably being carried out before the entry of the inorganic salt into the device, Then bringing the inorganic salt into contact with an aqueous flow containing at least one hydroxide salt to obtain in the device an aqueous fluid mixture containing an inorganic salt and a hydroxide salt and adjusting the concentration or amount of the hydroxide salt as a function of the concentration or amount of the inorganic salt needed to at least partially solubilize the inorganic salt. Preferably the measurement of the concentration or the amount of inorganic salt leaving the device is also performed.

20 Claims, 5 Drawing Sheets

DEVICE AND PROCESS UNDER CONDITIONS CLOSE TO THE SUPERCRITICAL RANGE OR UNDER SUPERCRITICAL CONDITIONS

CROSS REFERENCE TO RELATED APPLICATIONS

This is a U.S. National Phase Application under 35 U.S.C. § 371 of International Patent Application No. PCT/EP2018/081652, filed Nov. 16, 2018, which claims priority of French Patent Application No. 17 60895, filed Nov. 17, 2017. The entire contents of which are hereby incorporated by reference.

FIELD OF THE INVENTION

The present invention relates to the field of the treatment of an aqueous fluid containing an inorganic salt, in particular when this salt precipitates under conditions close to the supercritical range(s) and deteriorates the operation of the fluid treatment device.

BACKGROUND

A fluid is said to be supercritical when it is heated above its critical temperature and pressurized to a pressure higher than its critical pressure. In the supercritical range, the fluid has "hybrid" properties lying between those of liquids and those of gases, and has a density close to that of the liquid, but features low viscosity and high diffusivity that are characteristic of the behavior of gases.

SUMMARY

Supercritical water is a solvent used in many processes because it has interesting properties. In particular, its dielectric constant falls and causes the water to pass from a polar solvent that dissociates under normal temperature and pressure conditions (NTPC), to a non-dissociating polar solvent that favors the precipitation of inorganic compounds.

This precipitation phenomenon causes many problems on an industrial scale. For example, the main limitation of high temperature hydrothermal processes is the phenomenon of the precipitation of inorganic salts, which generally leads to the interruption of the process, due to the progressive clogging of the reactor by the solid deposition of inorganic salts on the walls. This restricts the choice of treatable products to those with a low content of inorganic species, wherein, to date, industrial solutions of less than 10 g/l, have been generally found to be not sufficiently satisfactory. Preventing or limiting the deposition of salts in reactors would thus allow extension of the scope of supercritical hydrothermal processes.

Molten salts are generally used for high temperature applications. In fact, their temperature stability, as well as their high calorific capacities coupled with low saturation vapor pressures and low viscosities, make them perfect candidates as a heat transfer fluid (solar, nuclear power plants . . . ). Furthermore, a molten salt has very specific solvation properties and can often dissolve a number of inorganic compounds. Molten salts are thus used in industry as a catalytic medium, and also in the steel industry. Therefore, the strong polarity of a molten salt, as well as its ionic character make it a good solvent for inorganic salts.

The principle of supercritical hydrothermal oxidation for waste recycling has been known for more than 30 years, with numerous research studies having been carried out on the subject. However, there are two well known major limitations regarding these processes. The first is that of corrosion as a function of the nature of the waste to be treated, in particular for waste that contains halogens. Certain corrosion problems of reactor parts may generally occur more or less quickly as a function of the nature of the alloy used and the conditions of use. The second limitation concerns the precipitation of inorganic salts (sulfates, carbonates, phosphates . . . ). Salts are commonly present in water and particularly in wastewater, because they are very soluble in wastewater under ambient conditions of temperature and pressure. On the other hand, this solubility collapses completely under conditions close to the supercritical range(s), and causes precipitation of these salts in solid form. Many efforts have been applied into the search for solutions to this second limitation via the development and engineering of reactors that are specially manufactured to limit the phenomenon of clogging. However, in spite of all these efforts applied to the development of innovative reactors, none has yet provided a definitive solution to the problem of precipitation of salts, while few of them have been implemented on an industrial scale. The most commonly-used industrial reactor remains the multi-injection tubular reactor. Its operation is based on controlling exothermic oxidation reactions by regulating the flow of oxygen supplied to the medium. However, it remains very vulnerable to the deposition of solid salt(s) on the walls of the reactor, and quickly leads to clogging.

The study referenced National Research Council. 1998. Using Supercritical Water Oxidation to Treat Hydrolysate from VX Neutralization. Washington, D.C.: The National Academies Press (https://doi.org/10.17226/6150) rules out the use of molten salts to dissolve inorganic salts precipitated at high temperature in a supercritical hydrothermal oxidation process due to the high corrosion produced. This study refers to a publication in the Russian Journal of Inorganic Chemistry (Borovaya, F. E., and M. I. Ravich. 1968. Solubility of sodium carbonate and orthophosphate in aqueous solutions of sodium hydroxide at elevated temperatures. *Russian Journal of Inorganic Chemistry* 13(12): 1720-1722.), in which researchers had carried out a fundamental thermodynamic study of the solubility of sodium carbonate and sodium orthophosphate in an aqueous solution of soda at high concentration and at high temperature. The National Research Council study considers this approach to be unworkable at the industrial level.

An object of the present invention is to solve the technical problem of providing a device and a process (or method) limiting or avoiding clogging of equipment by inorganic salts present in an aqueous fluid under conditions close to the supercritical range(s).

The present invention also aims to solve the technical problem of dissolving, at least in part, one or more inorganic salts precipitated during the passage of an aqueous fluid containing them, under conditions close to the supercritical range(s), while limiting or avoiding the corrosion phenomena.

The present invention also aims to solve the technical problem of providing a process and device for treating inorganic waste in an aqueous fluid where the water is under conditions close to the supercritical range(s), while limiting or avoiding the phenomena of corrosion. More particularly, the present invention aims to solve the technical problem of providing a device and process for supercritical hydrothermal oxidation (SOHO).

The present invention also aims to solve the technical problems mentioned above in an industrial, reliable and reproducible manner.

DETAILED DESCRIPTION

The inventors discovered, after many years of research focused on understanding the behavior of compounds in an aqueous fluid under conditions close to the supercritical ranges, that it was possible to solve one or more of the technical problems stated above. In particular, the inventors discovered that it is possible to dissolve inorganic salts in a molten hydroxide salt, while limiting or avoiding corrosion phenomena, by controlling the concentration or quantity of hydroxide salt to be injected as a function of the concentration or amount of the inorganic salts. Many industrial applications are foreseen.

The invention relates to a process comprising:
- the entry into a device of an aqueous fluid containing at least one inorganic salt, the water of the aqueous fluid in the device being under supercritical conditions or close to the supercritical range,
- the measurement of the concentration or the amount of inorganic salt in the device, wherein this measurement is preferably carried out before the entry of the inorganic salt into the device,
- the bringing into contact of the inorganic salt with an aqueous stream containing at least one hydroxide salt, so as to obtain an aqueous fluid mixture in the device containing an inorganic salt and a hydroxide salt,
- the adjustment of the concentration or amount of the hydroxide salt as a function of the concentration or amount of the inorganic salt needed to at least partially solubilize the inorganic salt, and,
- preferably, the measurement of the concentration or the quantity of inorganic salt leaving the device.

The term "aqueous mixture under conditions close to the supercritical range(s)" or equivalent terms such as, for example, "aqueous fluid under conditions close to the supercritical range(s)" or, more generally, "under conditions close to the supercritical range(s)", is understood to mean a fluid subjected to conditions of pressure and temperature close to the supercritical range of water, i.e. a pressure greater than 22.1 MPa and a temperature between 300° C. and 374° C., or to conditions of supercritical pressure and temperature for water, i.e. a pressure and temperature above the critical pressure and critical temperature of water.

The process is intended, in particular, for the treatment of fluids with a high content of inorganic salts which cause clogging problems in a device containing this fluid under conditions close to the supercritical range(s), due to the precipitation of the inorganic salt under conditions close to the supercritical range(s). In general, the present invention is applicable to any hydrothermal high temperature process where the presence of inorganic salts, soluble in an aqueous fluid under normal conditions of temperature and pressure (NCTP), but insoluble or poorly soluble in water under conditions close to the supercritical range(s), entails risks of clogging and the deposition of salt on the reactor walls.

The invention further relates to a device capable of operating under supercritical conditions comprising:
- heating and pressurizing means capable of placing water in conditions close to the supercritical range(s),
- a line for introducing an aqueous fluid into the device containing at least one inorganic salt,
- a device for measuring the concentration or the amount of inorganic salt in the device, wherein the measurement is preferably carried out before the entry of the inorganic salt into the device,
- a line for bringing the inorganic salt into contact with an aqueous fluid flow containing at least one hydroxide salt, so as to obtain in the device an aqueous fluid mixture containing an inorganic salt and a hydroxide salt,
- a device for adjusting the concentration or the quantity of the hydroxide salt as a function of the concentration or the quantity of the inorganic salt, so as to at least partially dissolve the inorganic salt, and
- preferably a device for measuring the concentration or the quantity of inorganic salt leaving the device.

The invention further relates to a device capable of operating under supercritical conditions comprising:
- heating and pressurizing means capable of placing water in conditions close to the supercritical range(s),
- a line for introducing into the device an aqueous fluid containing at least one inorganic salt,
- a device for measuring the concentration or quantity of inorganic salt entering the device,
- a line for bringing the inorganic salt into contact with an aqueous fluid flow containing at least one hydroxide salt, so as to obtain in the device an aqueous fluid mixture containing an inorganic salt and a hydroxide salt, said line comprising a filter, preferably composed of amorphous carbon beads of micrometric size, capable of retaining the precipitated inorganic salts and capable of causing the molten hydroxide salt to flow less rapidly than the aqueous fluid, and
- a device for measuring the saturation concentration of the hydroxide salt in the aqueous fluid mixture.

The process according to the invention may include one or more of the following characteristics, taken alone or in any technically feasible combination.

The process according to the invention initially comprises the entry into a device of an aqueous fluid in the device containing at least one inorganic salt, wherein the aqueous fluid is under conditions close to the supercritical range(s).

In one embodiment, the aqueous fluid containing the inorganic salt is introduced into the device at a flow rate between 0.10 kg/h and 10,000 kg/h, for example between 1 and 1000 kg/h, advantageously at a flow rate between 50 kg/h and 150 kg/h, very advantageously at a flow rate between 80 kg/h and 100 kg/h.

The device consists of one or more reactors capable of withstanding temperatures and pressures greater than the critical temperature and the critical pressure of water, respectively. For example, the device may be a reactor usually used in supercritical hydrothermal oxidation processes.

According to one embodiment, the aqueous fluid containing the inorganic salt also comprises organic compounds. These organic compounds may be, for example, waste from industrial processes. For example, this waste may be alcohol.

Alternatively, the aqueous fluid introduced into said device may be a water/organic compound mixture, for example a water/alcohol mixture, which allows sufficient exotherm with an oxidizing agent, such as, for example, oxygen, to reach conditions close to the supercritical range(s). Generally, exothermic energy achieves supercritical conditions. Conditions close to the supercritical range are generally achieved by heating, most often in the form of traditional resistive heating. In one embodiment, the temperature rise takes place firstly in a heat exchanger between the outgoing and incoming flows, then secondly by exothermic reaction. In a preferred embodiment, the alcohol is chosen from among $C_2$-$C_5$ monoalcohols, $C_2$-$C_5$ polyols and their mixtures. Preferably, the water/alcohol mixture is a water/butanol/propanol mixture.

Advantageously, the water of the aqueous fluid in the device is under conditions close to the supercritical range(s). For example, the aqueous mixture may be heated between 300° C. and 600° C., for example between 350° C. and 550° C., and may be brought to a pressure between 22.1 and 50 MPa, for example between 22.1 and 30 MPa.

The aqueous fluid is placed in the device under conditions close to the supercritical range(s), or is directly introduced into the device under conditions close to the supercritical range(s).

The inorganic salt present in the aqueous fluid is chosen from salts insoluble in the aqueous mixture under conditions close to the supercritical range(s) of water. Advantageously, the inorganic salt is chosen from halide salts, alkaline salts, alkaline earth salts and metal salts.

According to another variant, the process of the present invention covers the treatment of aqueous fluids comprising a phosphate salt, a sulfate salt and/or a carbonate salt.

According to another variant, the process of the present invention covers the treatment of aqueous fluids comprising a halide salt, typically chloride.

According to one embodiment, the inorganic salt is chosen from chlorides such as, for example, bromine chloride (BrCl), cobalt (II) chloride ($CoCl_2$), aluminum chloride ($AlCl_3$), ammonium chloride ($NH_4Cl$), silver chloride (AgCl), calcium chloride ($CaCl_2$), copper (I) chloride (CuCl), copper (II) chloride ($CuCl_2$), iron (II) chloride ($FeCl_2$), sodium chloride (NaCl), zinc chloride ($ZnCl_2$), gold (III) chloride ($AuCl_3$), lead (II) chloride ($PbCl_2$), lithium chloride (LiCl), magnesium chloride ($MgCl_2$), manganese (II) chloride ($MnCl_2$), mercury (II) chloride ($HgCl_2$), nickel (II) chloride ($NiCl_2$), potassium chloride (KCl) or tin (II) chloride ($SnCl_2$), among fluorides such as, for example, aluminum fluoride ($AlF_3$), cobalt (II) fluoride ($CoF_2$) ammonium fluoride ($NH_4F$), silver fluoride (AgF), calcium fluoride ($CaF_2$), iron (III) fluoride ($FeF_3$), sodium fluoride (NaF), copper (II) fluoride ($CuF_2$), zinc fluoride ($ZnF_2$), lithium fluoride (LiF), lead fluoride ($PbF_2$), magnesium fluoride ($MgF_2$), manganese (II) fluoride ($MnF_2$), nickel (II) fluoride ($NiF_2$), mercury fluoride ($HgF_2$), potassium fluoride (KF) or tin (II) fluoride ($SnF_2$), among bromides such as, for example, cobalt (II) bromide ($CoBr_2$), ammonium bromide ($NH_4Br$), silver bromide (AgBr), bromide calcium ($CaBr_2$), copper (II) bromide ($CuBr_2$), iron (II) bromide ($FeBr_2$), sodium bromide (NaBr), zinc bromide ($ZnBr_2$), lead (II) bromide ($PbBr_2$), lithium bromide (LiBr), magnesium bromide ($MgBr_2$), manganese (II) bromide ($MnBr_2$), nickel (II) bromide ($NiBr_2$), mercury (II) bromide ($HgBr_2$), platinum bromide ($PtBr_4$), potassium bromide (KBr) or tin (II) bromide ($SnBr_2$), among the iodides such as, for example, ammonium iodide ($NH_4I$), calcium iodide ($CaI_2$), cobalt (II) iodide ($CoI_2$), copper (I) iodide (CuI), iodide sodium (NaI), zinc iodide ($ZnI_2$), lead (II) iodide ($PbO_2$), lithium iodide (LiI), magnesium iodide ($MgI_2$), mercury (II) iodide ($HgI_2$), nickel (II) iodide ($NiI_2$), potassium iodide (KI) or tin (II) iodide ($SnI_2$), among carbonates such as, for example, ammonium carbonate (($NH_4)_2CO_3$), silver carbonate ($Ag_2CO_3$), calcium carbonate ($CaCO_3$), copper (II) carbonate ($CuCO_3$), iron (II) carbonate (FeCO3), sodium carbonate ($Na_2CO_3$), zinc carbonate ($ZnCO_3$), lead (II) carbonate ($PbCO_3$), lithium carbonate ($Li_2CO_3$), magnesium carbonate ($MgCO_3$), manganese carbonate ($MnCO_3$), nickel (II) carbonate ($NiCO_3$), mercury (I) carbonate ($Hg_2CO_3$), or potassium carbonate ($K_2CO_3$), among sulfates such as, for example, cobalt (II) sulfate ($CoSO_4$), aluminum sulfate ($Al_2(SO_4)_3$), ammonium sulfate (($NH_4)_2SO_4$), silver sulfate ($Ag_2SO_4$), barium sulfate ($BaSO_4$), sodium sulfate ($Na_2SO_4$), lead (II) sulfate ($PbSO_4$), lithium sulfate ($Li_2SO_4$), zinc sulfate ($ZnSO_4$), copper (II) sulfate pentahydrate ($CuSO_4.5H_2O$) iron sulphate heptahydrate ($FeSO_4.7H_2O$), magnesium sulphate ($MgSO_4$), manganese sulphate ($MnSO_4$), mercury (I) sulphate ($Hg_2SO_4$), nickel (II) sulphate hexahydrate ($NiSO_4.6H_2O$), potassium sulfate ($K_2SO_4$) or tin (II) sulfate ($SnSO_4$), among phosphates such as, for example, aluminum phosphate ($AlPO_4$), ammonium phosphate (($NH_4)_3PO_4$), calcium phosphate ($Ca_3(PO_4)_2$), sodium phosphate ($Na_3PO_4$), lithium phosphate ($Li_3PO_4$), magnesium phosphate ($Mg_3(PO_4)_2$), silver phosphate ($Ag_3PO_4$), zinc phosphate octahydrate ($Zn_2(PO_4)_3.8H_2O$), iron (II) phosphate octahydrate ($Fe_3(PO_4)_2.8H_2O$), lead (II) phosphate ($Pb_3(PO_4)_2$), barium phosphate ($Ba_3(PO_4)_2$), or potassium phosphate ($K_3PO_4$), among chromates such as, for example, silver chromate ($Ag_2CrO_4$), calcium chromate ($CaCrO_4$), copper (II) chromate ($CuCrO_4$), sodium chromate ($Na_2CrO_4$), sodium dichromate ($Na_2Cr_2O_7$), lead (II) chromate ($PbCrO_4$), mercury (I) chromate ($Hg_2CrO_4$), potassium chromate ($K_2CrO_4$) or potassium dichromate ($K_2Cr_2O_7$), nitrates such as, for example, chromium (III) nitrate ($Cr(NO_3)_3$), cobalt (II) nitrate ($Co(NO_3)_2$), aluminum nitrate ($Al(NO_3)_3$), ammonium nitrate ($NH_4NO_3$), silver nitrate ($AgNO_3$), calcium nitrate ($Ca(NO_3)_2$), copper (II) nitrate ($Cu(NO_3)_2$), iron (II) nitrate hexahydrate ($Fe(NO_3)_2.6H_2O$), sodium nitrate ($NaNO_3$), zinc nitrate ($Zn(NO_3)_2$), lead (II) nitrate ($Pb(NO_3)_2$), lithium nitrate ($LiNO_3$), manganese (II) nitrate ($Mn(NO_3)_2$), magnesium nitrate ($Mg(NO_3)_2$), nickel (II) nitrate ($Ni(NO_3)_2$) and potassium nitrate ($KNO_3$), perchlorates such as, for example, chromium perchlorate ($Cr(ClO_4)_3$), cobalt (II) perchlorate ($Mg(ClO_4)_2$), aluminum perchlorate ($Al(ClO_4)_3$), silver perchlorate ($AgClO_4$), calcium perchlorate ($Ca(ClO_4)_2$), copper (II) perchlorate ($Cu(ClO_4)_2$), iron (II) perchlorate ($Fe(ClO_4)_3$), sodium perchlorate ($NaClO_4$), lithium perchlorate ($LiClO_4$), magnesium perchlorate ($Mg(ClO_4)_2$), mercury (I) perchlorate ($Hg_2(ClO_4)_2$), nickel (II) perchlorate ($Ni(ClO_4)_2$) or potassium perchlorate ($KClO_4$), among acetates such as, for example, silver acetate ($AgC_2H_3O_2$), sodium acetate ($CH_3COONa$), zinc (II) acetate ($Zn(C_2H_3O_2)_2$), lithium acetate ($LiC_2H_3O_2$), magnesium acetate ($Mg(C_2H_3O_2)_2$), mercury (II) acetate ($Hg(C_2H_3O_2)_2$) or potassium acetate ($KC_2H_3O_2$), among chlorates such as, for example, cobalt (II) chlorate ($Co(ClO_3)_2$), ammonium chlorate ($NH_4ClO_3$), calcium chlorate ($Ca(ClO_3)_2$), sodium chlorate ($NaClO_3$), zinc chlorate ($Zn(ClO_3)_2$), lead (II) chlorate ($Pb(ClO_3)_2$), lithium chlorate ($LiClO_3$), magnesium chlorate ($Mg(ClO_3)_2$), mercury (II) chlorate ($Hg(ClO_3)_2$), nickel (II) chlorate ($Ni(ClO_3)_2$), or potassium chlorate ($KClO_3$), among thiocyanates such as, for example, thiocyanate ammonium ($NH_4SCN$), copper (I) thiocyanate (CuSCN), lead (II) thiocyanate ($Pb(SCN)_2$), lithium thiocyanate (LiSCN), mercury (II) thiocyanate ($Hg(SCN)_2$) or potassium thiocyanate (KSCN), hydrogen carbonates such as, for example, potassium hydrogen carbonate ($KHCO_3$), lithium hydrogen carbonate ($LiHCO_3$), sodium hydrogen carbonate ($NaHCO_3$) or hydrogen carbonate calcium ($Ca(HCO_3)_2$) or among permanganates such as, for example, calcium permanganate ($Ca(MnO_4)_2$), zinc permanganate ($Zn(MnO_4)_2$), or potassium permanganate ($KMnO_4$). According to one embodiment, the inorganic salt is chosen from the salts which may be re-solubilized in water by returning to the NTPCs after passing under conditions close to the supercritical range(s).

Preferably, the inorganic salt is chosen so that the difference between the precipitation temperature of said inorganic salt and the critical temperature of water is less than 150° C., advantageously less than 50° C. In one embodiment, the concentration of inorganic salt entering the device may be greater than, or equal to, the solubility limit of said salt under conditions close to the supercritical range(s). It may be, for example, between 0.1 g/l and 100 g/l. Advantageously, it may be between 1 g/l and 100 g/l, preferably between 5 g/l and 50 g/l.

The concentration or amount of inorganic salt in the device is measured directly or indirectly. This measurement is preferably carried out before the inorganic salt enters the device. For example, it may be carried out by inductively coupled plasma spectrometry under the usual conditions known to those skilled in the art.

An aqueous fluid containing at least one hydroxide salt is introduced into the device and brought into contact with the aqueous fluid containing at least one inorganic salt.

Figure 1:
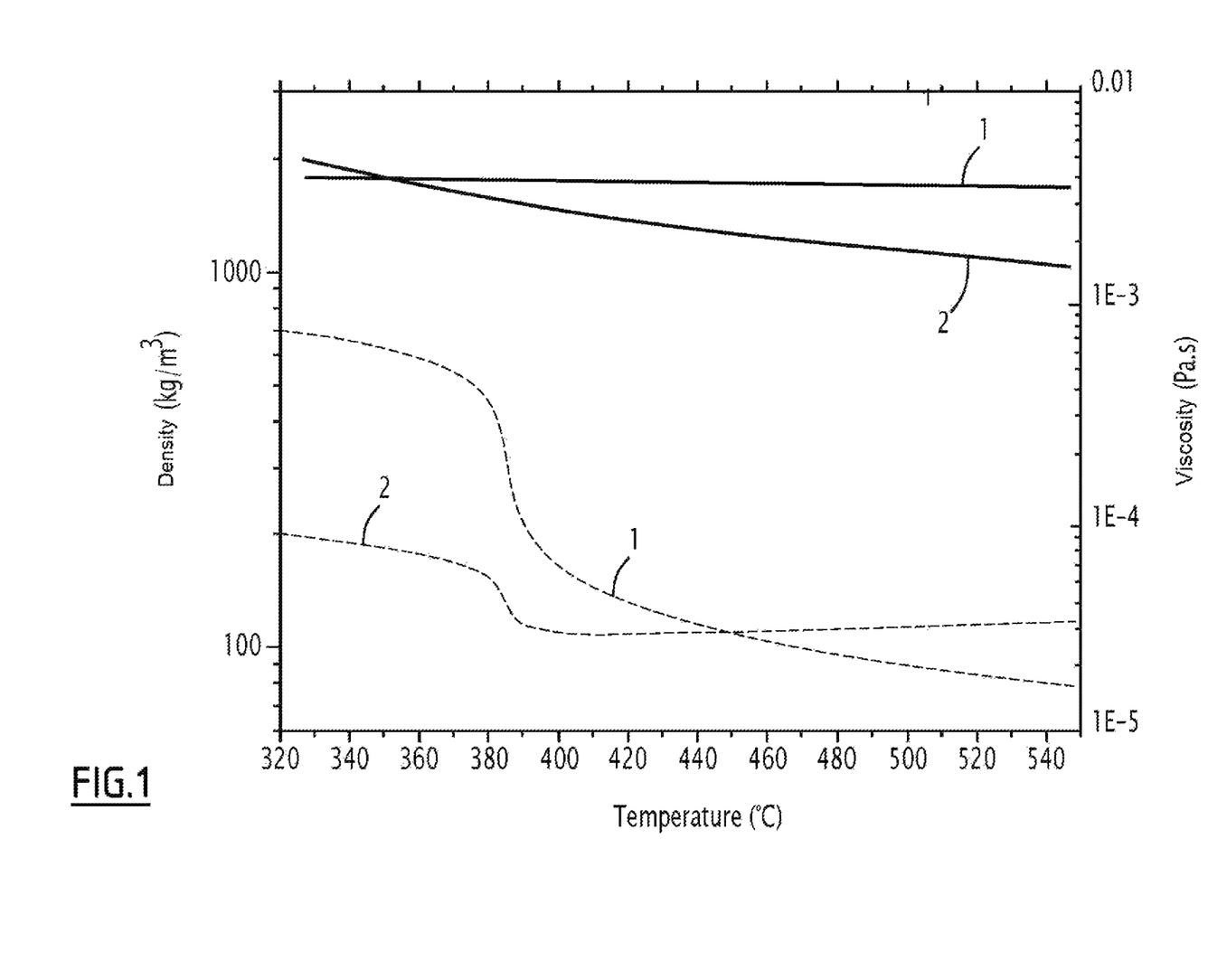
FIG. 1 represents the densities (curves 1) and viscosities (curves 2) of water (dashed lines) and molten soda (solid lines) as a function of temperature.

The hydroxide salt is advantageously chosen from among potassium hydroxide, sodium hydroxide (soda) and lithium hydroxide. As an example, FIG. 1 compares the viscosity (curves 2) and density (curves 1) between water (dotted lines) and molten soda (solid lines).

According to one embodiment, the aqueous fluid containing at least one hydroxide salt is a water/hydroxide salt mixture in the presence of at least one compound that oxidizes in the presence of dioxygen according to an exothermic reaction. According to one embodiment, the aqueous fluid containing at least one hydroxide salt may be a water/hydroxide salt/alcohol mixture, so as to allow sufficient exotherm to reach conditions close to the supercritical range(s). Preferably, the alcohol is chosen from among $C_2$-$C_5$ monoalcohols, $C_2$-$C_5$ polyols, advantageously diols, and their mixtures. Advantageously, the water/hydroxide salt/alcohol mixture is a water/soda/alcohol mixture, advantageously a water/soda/hexanediol mixture.

The aqueous fluid containing the hydroxide salt is injected into the device alternately with the aqueous fluid containing the inorganic salt, so as to continuously prevent the inorganic salts from being deposited in the device. The adequate quantity of hydroxide salt as a function of the concentration of inorganic species in the product to be treated, is added directly in the device to the aqueous fluid containing the inorganic salt. Alternatively, the injection of the aqueous fluid containing the hydroxide salt may be coupled with that of the fluid to be treated, so as to no longer be able to adapt the concentration of the starting hydroxide salt, but rather the ratio of the input flows of the hydroxide salt and inorganic salt. This allows, in particular, the use of a single hydroxide salt solution for different types of waste, by simply adapting the flow rates of each of the flows.

In one embodiment, the aqueous flow containing the hydroxide salt is introduced into the device at a flow rate between 0.10 kg/h and 10,000 kg/h, for example between 1 and 1000 kg/h, advantageously at a flow rate between 50 kg/h and 150 kg/h, very advantageously at a flow rate between 80 kg/h and 100 kg/h.

Alternatively, the aqueous fluid containing the hydroxide salt may be mixed with the aqueous fluid containing the inorganic salt before the latter enters the device.

Alternatively, the aqueous fluid containing the hydroxide salt may be injected intermittently into the device. The aqueous fluid containing the hydroxide salt may be injected punctually at regular intervals in order to reduce the amount of salt deposited in the reactor. This approach is particularly advantageous since it makes it possible to limit the concentration or the quantity of hydroxide salt present in the device, and thus to limit, even to avoid, the corrosion phenomena all the more. The solution of products to be treated is injected continuously for a fixed period, which we will call $t_1$. At the end of this period $t_1$, the increase in the pressure differential in the system, due to the progressive deposition of salt, will have reached a limit fixed by the process. The product injection is then interrupted, so as to switch to the injection of the aqueous fluid containing the hydroxide salt, which is then injected for a period $t_2$. At the end of this period $t_2$, the injection is again switched to the product to be treated for a new period $t_1$, and so on. This procedure allows, in particular, the punctual removal of the salt plugs formed. The hydroxide salt may also participate in the reactions involved in the device. Knowing the solubility limits of the inorganic species present, the amount of salt precipitated during the period $t_1$ may therefore be estimated, so as to determine the required duration of the injection of hydroxide salt (knowing the concentration of said hydroxide salt) needed to dissolve the deposited salt.

Advantageously, the pressure differential between the inlet and the outlet of the device is measured and the aqueous fluid containing the hydroxide salt is injected when said differential exceeds a predetermined pressure differential threshold value. In one embodiment, this threshold value lies between 0.5 and 5 MPa, preferably between 2 and 3 MPa.

Figure 5:
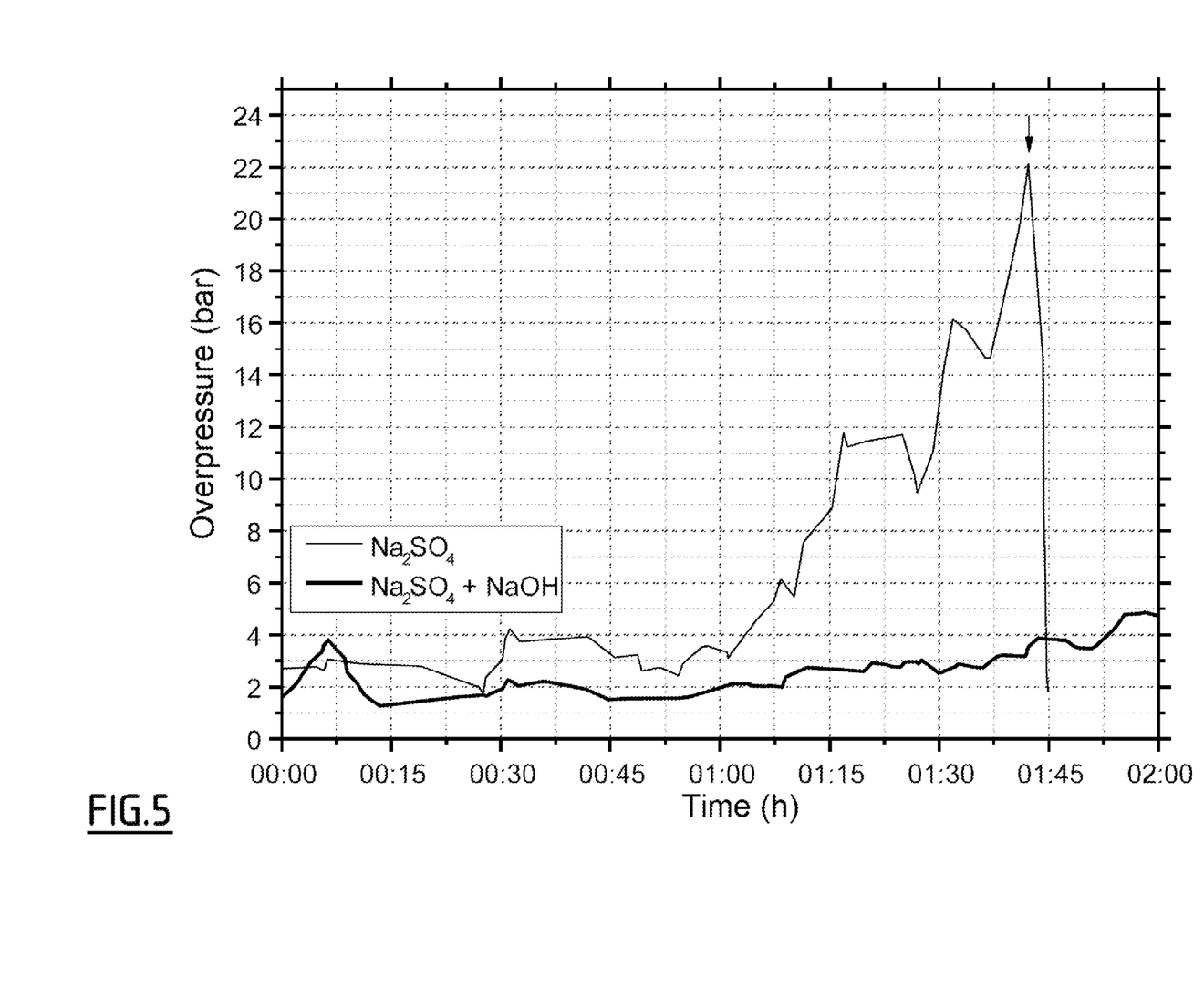
FIG. 5 represents the evolution of the pressure differentials in the process of a test using pulse injection of soda (bold line), and of a test without soda injection according to a particular embodiment described in Example 3.

In a particular embodiment, the pulse injection of a sodium hydroxide solution into an aqueous fluid containing sodium sulfate makes it possible to limit clogging of the device, and therefore to limit the increase in pressure in the reactor, as shown in FIG. 5. Premature interruption of the process, indicated by an arrow in FIG. 5, is thus avoided.

An aqueous fluid mixture containing an inorganic salt and a hydroxide salt is obtained in the device. Under conditions close to the supercritical range(s) of water, the hydroxide salt precipitates and then melts to form a molten salt phase. The inorganic salt precipitated in the aqueous fluid dissolves in the molten salt phase.

The concentration or the amount of hydroxide salt is adjusted according to the solubility limit of said hydroxide salt at the given pressure and temperature as well as the concentration of inorganic species present in the fluid to be treated. If the solubility of the inorganic compound in the hydroxide salt is known, then the concentration of hydroxide salt should be adjusted according to this value. In the event that this value is not known, the concentration of hydroxide salt may then be adjusted on the basis of a solubility of between 30 and 60% by mass, advantageously between 35 and 45% by mass. In one embodiment, the concentration of hydroxide salt may be greater than, or equal to, the limit of solubility of the salt under conditions close to the supercritical range(s), for example between 1 g/l and 200 g/l, advantageously between 2 g/l and 200 g/l, preferably between 10 g/l and 100 g/l.

According to a variant, the quantity (or the concentration) of hydroxide salt may be adjusted so that the quantity (or concentration) of inorganic salt leaving the device is greater than 60%, advantageously greater than 75%, preferably greater 90% of the amount (or concentration) of inorganic salt entering the device. The higher the quantity (or concentration) of inorganic salt leaving the device, the less inorganic salt there is in the form of a precipitate in the device, and, therefore, the lower the risk of clogging of the device.

The adjustment of the concentration or amount of the hydroxide salt according to the concentration or amount of the inorganic salt, may be carried out repeatedly in a discontinuous or continuous manner. The adjustment of the concentration or amount of salt based on the concentration or amount of the inorganic salt includes monitoring the concentration of inorganic salt input. Alternatively, the concentration of inorganic salt may be monitored at the outlet of the device. The monitoring of the inorganic salt concentration may be advantageously carried out by inductively coupled plasma (ICP) spectrometry.

The adjustment of the concentration or quantity of the hydroxide salt injected makes it possible to limit corrosion within the device.

Figure 2:
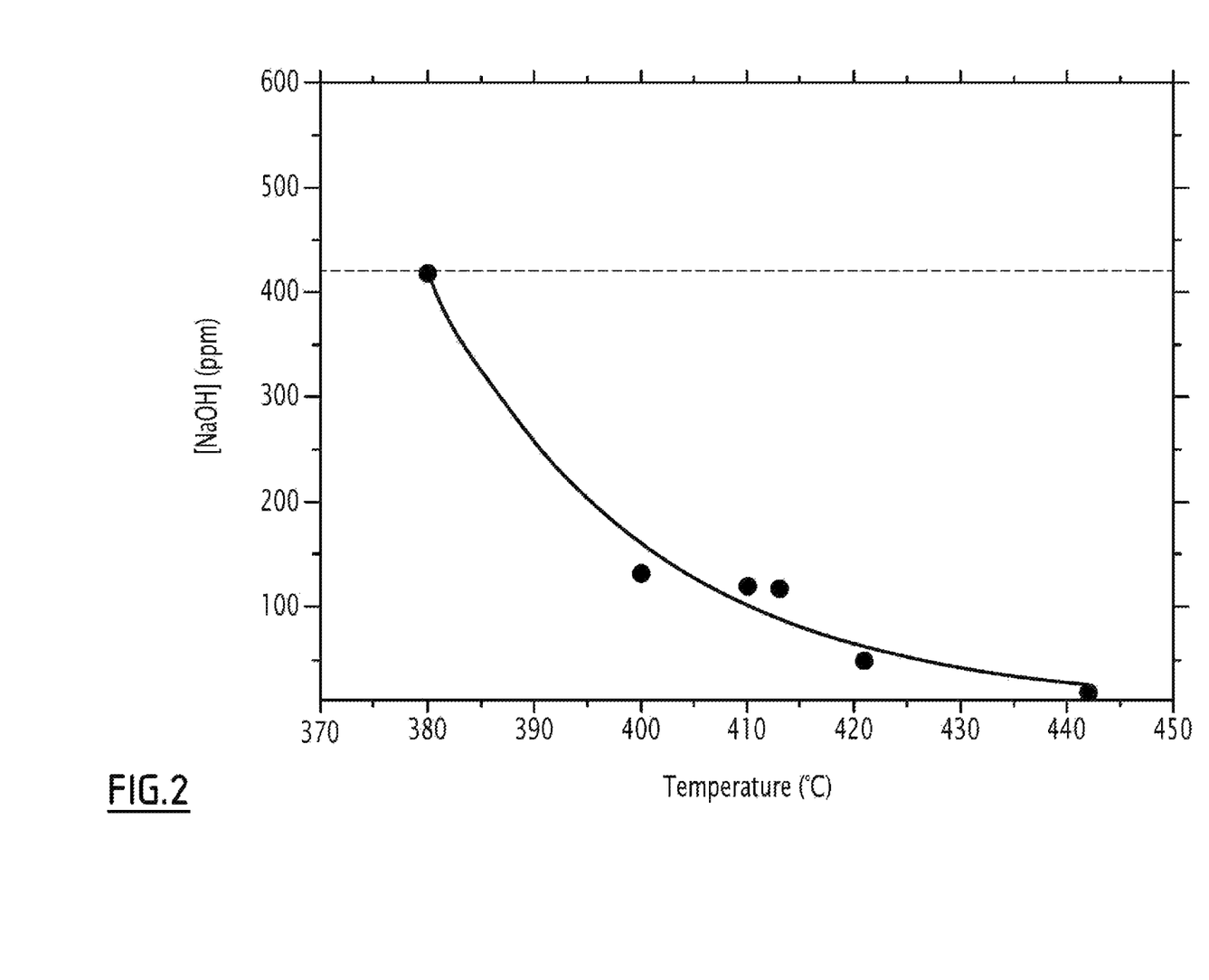
FIG. 2 represents the solubility of soda in water at 25 MPa as a function of the temperature, measured according to the protocol of example 1.

Preferably, the process according to the invention comprises a preliminary step of measuring the solubility of the hydroxide salt in the aqueous fluid mixture under conditions close to the supercritical range(s). This preliminary measurement step may be carried out, for example, in an assembly comprising a metal tube in which an aqueous fluid containing a hydroxide salt of known concentration, continuously circulates. The tube is heated to the desired temperature and pressurized to 25 MPa. The tube is half filled with a filter comprising micrometric-size amorphous carbon beads, on the one hand so as to prevent the precipitated solid inorganic salts from being entrained in the flow, and, on the other hand so as to be able to slow down the flow of the molten hydroxide salt and allow a saturated concentration to be measured. In fact, the principle consists of playing on the differences in density and viscosity between molten soda and supercritical water, and using flow rates of the order of 1 ml/min so as to avoid turbulence phenomena. Because of these differences, the two phases do not flow at the same speed through the filter which acts as a porous medium, and which makes it possible to measure at the outlet, the saturation concentration of salt remaining in the water by sampling. and measurement by inductively coupled plasma spectrometry. In fact, the measured value corresponds to the solubility value of the hydroxide salt in the aqueous fluid for the given temperature. After a certain time, the salt concentration returns to its initial value, which signals the moment when the flow of molten salt reaches the outlet of the assembly and the system is then in steady state. We may then repeat the operation for different temperatures and thus obtain the solubility curve of the salt in question. FIG. 2 thus represents the solubility of soda in water at 25 MPa as a function of temperature.

Preferably, knowing these hydroxide salt solubility values makes it possible to evaluate the proportion of the molten salt phase formed after precipitation, and thus to determine the maximum amount of inorganic salt soluble in this molten hydroxide salt phase.

Preferably, the process comprises a preliminary step of measuring the solubility of the inorganic salt in the molten hydroxide salt under conditions close to the supercritical range(s). This measurement step consists, for example, in injecting an aqueous solution of an inorganic salt of known concentration, so as to precipitate the salt and to deposit it on the walls of the reactor, while ensuring that the output concentration is indeed that of the solubility limit under conditions close to the supercritical range(s) of water. In a second step, the injection of the saline solution is interrupted, so as to be able to inject a solution of a hydroxide salt of known concentration in the system. The aim of this second step is to precipitate the hydroxide salt, which, when it melts, dissolves the deposit of inorganic salt, which is then entrained in the flow with the inorganic salt to dissolve in water under subcritical conditions. The respective concentrations of hydroxide salt and inorganic salt are then measured at the outlet, and the proportion of salt dissolved by the molten hydroxide salt is determined. Several samples are taken at regular time intervals for the same temperature, to verify that the concentration limit of inorganic salt in the molten hydroxide salt has been reached. This step makes it possible to determine the solubility of the inorganic salt in the hydroxide salt, and thus to optimally adjust the concentration or the quantity of said hydroxide salt to be introduced, so as to dissolve the inorganic salt precipitated in the reactor.

Figure 3:
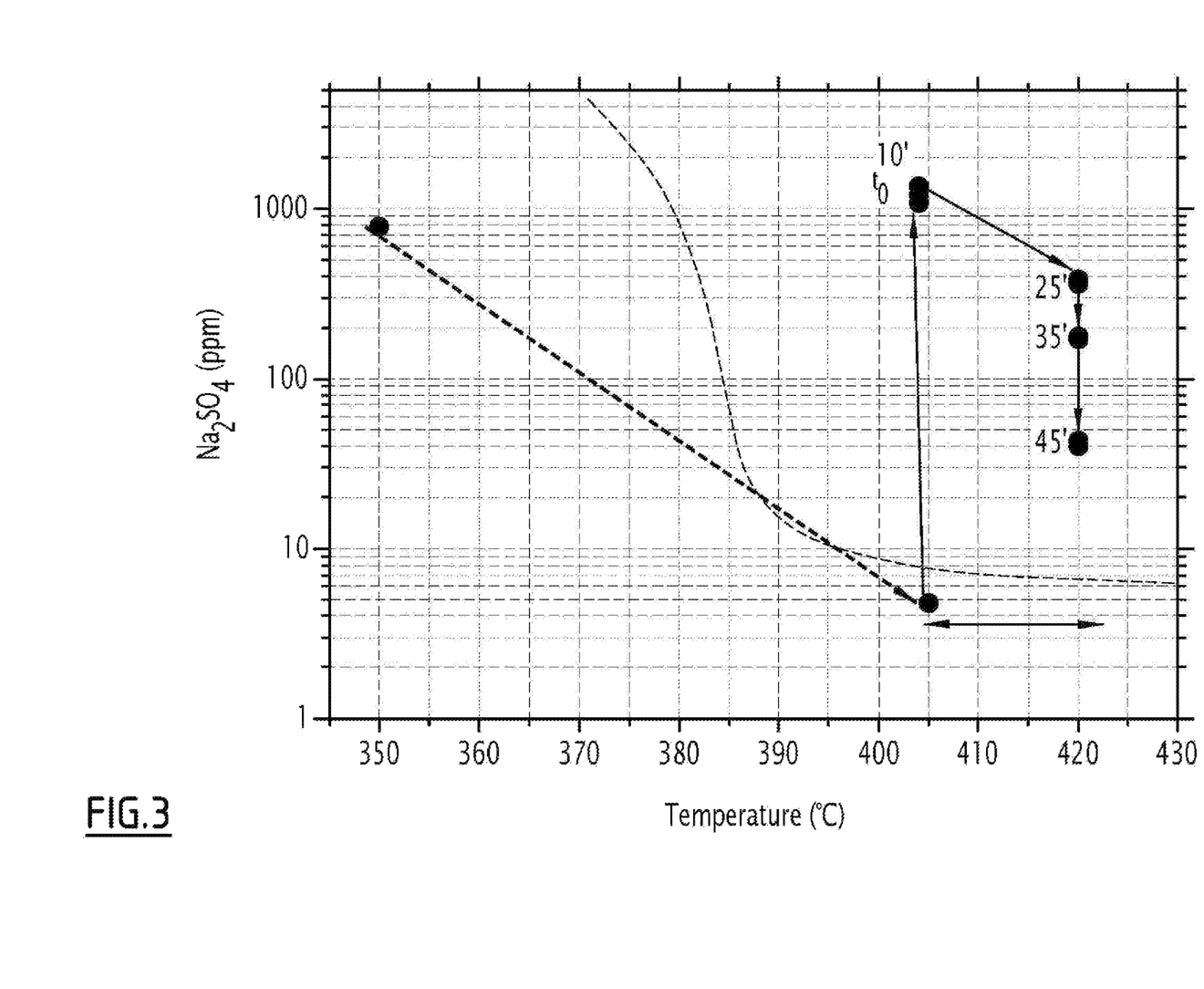
FIG. 3 represents the solubility of sodium sulphate in water at 25 MPa (in dotted lines), and the evolution of the concentration of sodium sulphate at the outlet of the process during the precipitation and the deposition of salt, then to 0.05 mold during the transition to soda, for different times and different temperatures in a particular embodiment, according to the protocol of Example 2.
Figure 4:
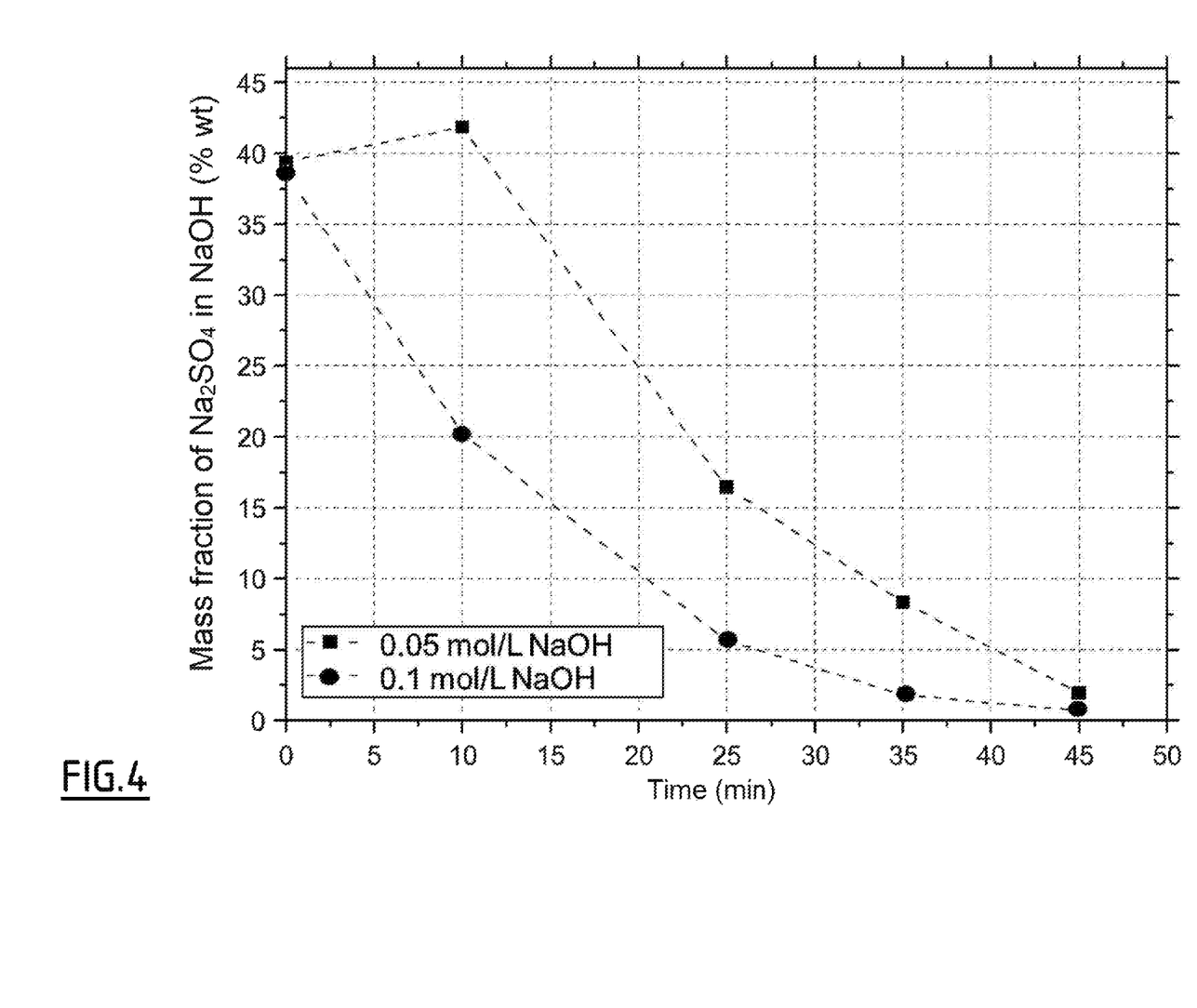
FIG. 4 represents the evolution of the mass fractions of sodium sulphate in the molten soda phase as a function of time for different concentrations of soda solutions in an embodiment described in Example 2.

In a particular embodiment, this preliminary step may be carried out to measure the solubility of sodium sulfate in sodium hydroxide under the supercritical conditions of water, as shown in FIG. 3. The dotted curve represents the solubility of sodium sulfate in water at 25 MPa. At $t_0$, a sodium hydroxide solution is injected. The data for mass fractions of $Na_2SO_4$ contained in the molten sodium hydroxide phase, as a function of time and of the concentration of the sodium hydroxide solution, tend to show that the saturation seems to be around 40% by mass of salt in the sodium hydroxide for temperatures between 400 and 420° C., as illustrated in FIG. 4.

The process according to the invention may be a supercritical hydrothermal oxidation process for treating an aqueous fluid containing inorganic salts.

According to a variant, the aqueous fluid may be placed under pressure and temperature conditions below the conditions close to the supercritical range(s) after leaving the device in which the aqueous fluid is under conditions close to the supercritical range(s). Typically, the aqueous fluid is placed under normal conditions of temperature and pressure (NCTP) after leaving the device in which the aqueous fluid is under conditions close to the supercritical range(s).

The invention also relates to a device capable of operating under conditions close to the supercritical range(s) comprising heating and pressurizing means that are capable of placing water under conditions close to the supercritical range(s), a line for introduction into the device of an aqueous fluid containing at least one inorganic salt, and a device for measuring the concentration or quantity of inorganic salt in the device, wherein the measurement is preferably carried out before the entry of the inorganic salt into the device, a line for bringing the inorganic salt into contact with an aqueous stream containing at least one hydroxide salt, so as to obtain in the device an aqueous fluid mixture containing an inorganic salt and a hydroxide salt, a device for adjusting the concentration or the quantity of hydroxide salt as a function of the concentration or amount of the inorganic salt needed to at least partly dissolve the inorganic salt, and, preferably, a device for measuring the concentration or the quantity of inorganic salt leaving the device.

The heating and pressurizing means capable of placing water under conditions close to the supercritical range(s) are the usual means known to those skilled in the art.

According to one embodiment, the aqueous fluid containing the hydroxide salt may be injected into the device alternately with the aqueous fluid containing the inorganic salt. Alternatively, it may be mixed with the aqueous fluid containing the inorganic salt before the latter enters the device. Alternatively, it may be injected discontinuously by pulse into the device.

Advantageously, the aqueous fluid containing at least one inorganic salt is stored in a storage tank that is in fluid communication with the device according to the invention.

The device comprises means capable of placing the water of the aqueous mixture in the device under conditions close to the supercritical range(s).

Advantageously, the aqueous mixture may be heated between 300° C. and 600° C., for example between 350° C. and 550° C., and may be brought to a pressure between 22.1 and 50 MPa, advantageously between 22.1 and 30 MPa.

According to one embodiment, the device comprises an outlet line for the fluid mixture, which comprises means for passing under subcritical conditions, i.e. at a temperature and pressure below the critical temperature and the critical pressure of the water, preferably NCTP. This passage out of the conditions close to the supercritical range(s) generally results in the resolubilization of all of the salts. Thus, according to a variant, the inorganic salt may be easily separated from the aqueous fluid, in particular for its subsequent use, its recycling or its recovery (for example its sale). Such separation means are known to those skilled in the art. According to a variant, the hydroxide salt may be recycled at the inlet of the device, possibly via a storage tank.

The invention further relates to a solubility measurement device capable of operating under supercritical conditions comprising heating and pressurizing means capable of placing water under conditions close to the supercritical range (s), a line for introduction into the device of an aqueous fluid containing at least one inorganic salt, a device for measuring the concentration or quantity of inorganic salt entering the device, a line for bringing the inorganic salt into contact with an aqueous stream containing at least one hydroxide salt, so as to obtain in the device an aqueous fluid mixture containing an inorganic salt and a hydroxide salt, said line comprising a filter that is capable of retaining the precipitated inorganic salts and that is capable of causing the molten hydroxide salt to flow less rapidly than the aqueous fluid, and a device for measuring the saturation concentration of the hydroxide salt in the mixture of aqueous fluid.

In one embodiment, the heating and pressurizing means capable of placing water in conditions close to the supercritical range(s) are means known to those skilled in the art.

In one embodiment, the device comprises a tank containing an aqueous fluid containing at least one hydroxide salt. Said tank comprises a pump to allow the injection of said aqueous fluid into a line through which an aqueous fluid containing at least one inorganic salt circulates.

In one embodiment, said line comprises a filter composed of micrometric-size amorphous carbon beads, and which is capable of retaining the precipitated inorganic salts and of causing the molten hydroxide salt to flow less rapidly than the aqueous fluid.

In one embodiment, there is a cooling system at the outlet of the line that is capable of re-passing the water of the aqueous mixture under subcritical conditions.

According to one embodiment, the solubility measuring device further comprises an apparatus making it possible to measure the concentration of inorganic salt leaving the device. Advantageously, this apparatus comprises a conductimetric cell.

In one embodiment, said measuring device is placed directly at the outlet of the cooling system to which it is connected. Alternatively, said device is not connected to the cooling system and requires samples to be taken at the outlet of the cooler.

In one embodiment, the device includes a back pressure regulator to control the pressure within the device.

In one embodiment, the device comprises a fluid sampling system at the outlet of the line, which makes it possible to collect said fluid in order to carry out measurements, such as a pH measurement.

The dissolution of the inorganic salts in the molten hydroxide salt makes it possible to limit, or even prevent, clogging of the device used during a hydrothermal process at high temperature. It avoids long shutdown times for reactor cleaning, as well as repeated alternation of the start-stop phase. Determining the optimum concentration or quantity of hydroxide salt to be introduced into the device as a function of the concentration or quantity of inorganic salts present in the aqueous fluid makes it possible to adjust the process in order to limit the corrosion phenomena, and to implement a reliable industrial process. Thus, the process makes it possible to control the injection of hydroxide salt, and, therefore, to limit the concentration or the quantity injected. This makes it possible to avoid, or at least reduce, the corrosion phenomena within the device. Thus, the device and the process according to the invention advantageously comprise a device for controlling the concentration of hydroxide salt present in, or injected into, the device under conditions close to the supercritical range(s).

The invention also makes it possible to extend the field of waste treatable by a high-temperature hydrothermal process to include waste having a salt content greater than 10 g/l.

The terms "according to the invention" define any of the embodiments, variants, and advantageous or preferred characteristics, taken alone or in any of their combinations.

Other objects, characteristics and advantages of the invention will become apparent to those skilled in the art after reading the explanatory description which refers to examples which are given only by way of illustration and which do not in any way limit the scope of the invention.

The examples form an integral part of the present invention and any characteristic, which appears to be novel compared with any prior art and from the description taken as a whole and including the examples, forms an integral part of the invention in its function and in its general nature.

Thus, each example is general in scope.

On the other hand, in the examples, all the percentages are expressed by mass unless otherwise indicated, the temperature is ambient 20-25° C. expressed in degrees Celsius unless otherwise indicated, and the pressure is given in atmospheric pressure (101325 Pa) unless otherwise indicated.

EXAMPLES

Example 1 (FIGS. 1 and 2)

It has been demonstrated that the soda precipitates under supercritical hydrothermal conditions, and then that this precipitated soda melts to form a liquid phase immiscible with the supercritical aqueous phase.

The experimental setup consists of a metal tube in which a soda solution of known concentration circulates continuously. The tube is heated to the desired temperature and pressurized to 25 MPa. The tube is half filled with a filter composed of micrometric size amorphous carbon beads, firstly to prevent the precipitated solid inorganic salts from being entrained in the flow, and secondly to slow down the flow of soda and allow the measurement of a concentration at saturation.

Due to the differences in density and viscosity between molten soda and water in supercritical conditions, the two phases do not flow at the same speed through the filter (which acts as a porous medium), which allows us to measure the saturated salt concentration remaining in the water at the outlet (by sampling and ICP spectrometry measurement), which, in fact, corresponds to its solubility value for the given temperature.

After a certain time, the salt concentration returns to its initial value, which signals the moment the flow of molten salt reaches the outlet of the assembly, wherein the system is then in steady state. The operation is repeated for different temperatures to thus obtain the solubility curve of the salt in question (FIG. 2).

Knowledge of these solubility values of the hydroxide salt is decisive in the evaluation of the proportion of the molten salt phase formed after precipitation and that is immiscible with the supercritical aqueous phase. This proportion is, in particular, necessary in order to determine the maximum quantity of soluble salt in this molten salt phase.

Example 2 (FIGS. 3 and 4)

Using the previous setup, an experimental methodology was implemented to determine the maximum amount of inorganic salt soluble in the molten salt phase.

A first step consists in injecting an aqueous solution of sodium sulphate ($Na_2SO_4$) of known concentration, so as to precipitate the salt and effect a deposit on the walls of the reactor. The concentration at the outlet of the inorganic salt is, in fact, that of the solubility limit under the given temperature and pressure conditions.

In a second step, the injection of the saline solution is interrupted in order to be able to inject a sodium hydroxide solution (NaOH) of known concentration into the system. The soda precipitates, and then melts. It then dissolves the deposit of $Na_2SO_4$, which is then entrained in the stream with the soda. The sodium sulphate then re-dissolves in water under subcritical conditions. The respective NaOH and $Na_2SO_4$ concentrations are measured by sampling at the outlet in order to measure the proportion of salt dissolved by the molten soda (knowing the solubility of $Na_2SO_4$). Several samples are taken at regular time intervals for the same temperature, to verify that the salt concentration limit in the soda has been reached.

The data for mass fractions of $Na_2SO_4$ contained in the molten sodium hydroxide phase, as a function of time and of the concentration of the sodium hydroxide solution, tend to show that the saturation appears to be around 40% by mass of salt in the sodium hydroxide, for temperatures between 400° C. and 420° C. at 25 MPa. For the highest concentrations of soda, the resulting salt deposition does not appear to be sufficient to allow several measurements at saturation before all the salt is consumed.

Furthermore, no trace of corrosion was detected during these tests (Ni and Cr concentrations below the detection limit of 1 ppm).

Example 3 (FIG. 5)

Tests were carried out on an industrial scale. First, a typical waste, composed of a water/butanol/propanol mixture containing sodium sulfate at a concentration of 5 g/l, is treated by a supercritical hydrothermal oxidation process to allow sufficient exothermic oxidation. The presence of alcohol allows the mixture to be placed in supercritical conditions by reaction with dioxygen.

We measure after how long must the process be interrupted due to the clogging of the device by the deposition of the inorganic salt.

In a second step, the same product is treated in an identical manner, with the difference that a temporary injection of hexanediol/water/soda solution is carried out regularly in order to reduce the clogging of the reactor by the salt.

The results of these preliminary tests showed that the operating time of the process could be doubled before having to interrupt the test. This shows, therefore, a significantly positive effect of sodium hydroxide on the process clogging time due to the presence of inorganic salt in the product to be treated.

In addition, no trace of corrosion was observed.

Example 4 (Theoretical Example)

By knowing the concentration of inorganic salt in a waste to be treated by the supercritical hydrothermal oxidation process, it is possible to calculate the quantity of soda, and the injection time required, to dissolve this inorganic salt.

For example, a waste to be treated by a supercritical hydrothermal oxidation process contains an inorganic salt of sodium sulfate at a concentration of 5 g/l. The effluent is injected into the process at a rate of 90 kg/h.

For this concentration, precipitation occurs as of a temperature of 380° C. for a pressure of 25 MPa, wherein the salt concentration in the aqueous phase then drops to a value of 5 ppm. The amount of salt deposited in the process may then be estimated at 449.55 g/h. A waste treatment time of 15 min is chosen, so as to then be able to inject a sodium hydroxide solution, with a concentration of 4 g/l. At 380° C., the solubility of the soda is 200 ppm, which means that the amount of molten soda formed is 342 g/h.

Knowing that the maximum mass fraction of salt in molten soda is 40%, we may then deduce the soda injection time required to dissolve the amount of salt previously deposited from the previous calculations. It would then take a 30-minute injection to dissolve all of the salt using the molten soda.

Example 5

An aqueous mixture composed of water and a 30 g/l sodium hydroxide concentration is introduced into a batch reactor. The whole is brought to supercritical conditions at 25 MPa and 500° C. After these conditions have been maintained for 60 minutes, the assembly is cooled and depressurized. The remaining solution is then analyzed by ICP spectrometry measurements. Almost all of the amount of sodium initially introduced is present in the aqueous phase. No trace of corrosion was detected (chromium and nickel levels below 1 ppm), while there were no traces of precipitation on the walls of the reactor. This example shows that a process and device according to the invention does not undergo clogging or corrosion.

Example 6

An aqueous mixture composed of water and a 30 g/l sodium hydroxide concentration is prepared. The setup used consists of a 1 meter long tubular reactor, ¾ inch in diameter and composed of inconel. The system operates continuously using a high pressure pump and a pressure regulating valve at the outlet of the assembly. The aqueous solution is thus injected at a flow rate of between 0.5 and 1.5 l/h, the setup is maintained at a pressure of 25 MPa and the temperature of the tubular reactor is brought to 450° C. The setup is maintained under these conditions for one hour without any overpressure being observed. The system is then shut down and cooled. No solid deposit is present in the reactor and no trace of corrosion is detected in the samples taken at the outlet of the assembly during the test.

This example shows that a process and device according to the invention does not clog and does not undergo corrosion.

The invention claimed is:

1. A process comprising the steps of:
   entering, into a device, an aqueous fluid containing at least one inorganic salt, the water of the aqueous fluid in the device being under supercritical conditions or close to the supercritical range,
   measuring the concentration or the amount of inorganic salt in the device,
   contacting the inorganic salt with an aqueous stream containing at least one hydroxide salt, so as to obtain an aqueous fluid mixture in the device containing an inorganic salt and a hydroxide salt, and
   adjusting the concentration or amount of the hydroxide salt as a function of the concentration or amount of the inorganic salt needed to at least partially solubilize the inorganic salt.

2. The process according to claim 1, wherein adjusting the concentration or the amount of the hydroxide salt according to the concentration or the amount of the inorganic salt is carried out at least one of repeatedly, discontinuously or continuously.

3. The process according to claim 1, wherein adjusting the concentration or the amount of the hydroxide salt as a function of the concentration or the amount of the inorganic salt comprises monitoring the concentration of inorganic salt at an inlet and/or at an outlet of the device.

4. The process according to claim 1, wherein the aqueous mixture is heated to between 300° C. and 600° C., and brought to a pressure between 22.1 and 50 MPa.

5. The process according to claim 1, wherein the aqueous mixture is heated to between 350° C. and 550° C., and brought to a pressure between 22.1 and 50 MPa.

6. The process according to claim 1, wherein the aqueous fluid containing at least one inorganic salt further comprises organic compounds.

7. The process according to claim 1, wherein the hydroxide salt is chosen from among potassium hydroxide, sodium hydroxide and lithium hydroxide.

8. The process according to claim 1, wherein the aqueous fluid containing the hydroxide salt is injected into the device alternately with the aqueous fluid containing the inorganic salt.

9. The process according to claim 1, wherein the aqueous fluid containing the hydroxide salt is mixed with the aqueous fluid containing the inorganic salt before the latter enters the device.

10. The process according to claim 1, wherein the aqueous fluid containing the hydroxide salt is injected discontinuously by pulse into the device.

11. The process according to claim 10, wherein the pressure differential between an inlet and an outlet of the device is measured, and the aqueous fluid containing the hydroxide salt is injected when said pressure differential exceeds a predetermined threshold value.

12. The process according to claim 1, comprising a preliminary step of measuring the solubility of the hydroxide salt in the aqueous fluid mixture under supercritical conditions.

13. The process according to claim 1, comprising a preliminary step of measuring the solubility of the inorganic salt in the hydroxide salt being molten under supercritical conditions.

14. The process according to claim 1, wherein the process is a supercritical hydrothermal oxidation process for the treatment of an aqueous fluid containing inorganic salts.

15. The process according to claim 1, wherein the measurement of the concentration or the amount of inorganic salt in the device is carried out before the entry of the inorganic salt into the device.

16. The process according to claim 1, further comprising the measurement of the concentration or the quantity of inorganic salt leaving the device.

17. A device capable of operating in supercritical conditions comprising:
   a heating and pressurizing device capable of placing water in conditions close to the supercritical range(s) or under supercritical conditions,
   a first line introducing into the device an aqueous fluid containing at least one inorganic salt,
   a measuring device measuring the concentration or the amount of inorganic salt in the device,
   a second line bringing the inorganic salt into contact with an aqueous fluid flow containing at least one hydroxide salt in order to obtain in the device an aqueous fluid mixture containing an inorganic salt and a hydroxide salt, and
   an adjustment device adjusting the concentration or the amount of the hydroxide salt as a function of the concentration or the amount of the inorganic salt to at least partially dissolve the inorganic salt.

18. The device according to claim 17, wherein the measurement of the concentration or the amount of inorganic salt in the device is carried out before the entry of the inorganic salt into the device.

19. The device according to claim 17, further comprising a device for measuring the concentration or the amount of inorganic salt leaving the device.

20. A device capable of operating in supercritical conditions comprising:
   a heating and pressurizing device capable of placing water under conditions close to the supercritical range(s) or under supercritical conditions, a first line introducing into the device an aqueous fluid containing at least one inorganic salt, a measuring device measuring the concentration or amount of inorganic salt entering the device, a second line bringing the inorganic salt into contact with an aqueous fluid stream containing at least one hydroxide salt in order to obtain in the device an aqueous fluid mixture containing an inorganic salt and a hydroxide salt, said second line comprising a filter capable of retaining precipitated inorganic salts, and capable of causing the hydroxide salt in a molten state to flow less rapidly than the aqueous fluid, and a second measuring device measuring the saturation concentration of the hydroxide salt in the aqueous fluid mixture.

* * * * *